United States Patent
Neary

(10) Patent No.: US 8,814,215 B2
(45) Date of Patent: Aug. 26, 2014

(54) RESPONSE FORM SECURITY DEVICE

(76) Inventor: Leonore Martin Neary, Glen Ellyn, IL (US)

(*) Notice: Subject to any disclaimer, the term of this patent is extended or adjusted under 35 U.S.C. 154(b) by 617 days.

(21) Appl. No.: 12/218,736

(22) Filed: Jul. 17, 2008

(65) Prior Publication Data

US 2010/0012541 A1 Jan. 21, 2010

(51) Int. Cl.
| | |
|---|---|
| *B42D 1/00* | (2006.01) |
| *B42D 19/00* | (2006.01) |
| *B42D 5/00* | (2006.01) |
| *B42D 3/00* | (2006.01) |
| *B42D 7/00* | (2006.01) |
| *B42D 17/00* | (2006.01) |
| *B42D 15/00* | (2006.01) |
| *G09B 3/06* | (2006.01) |

(52) U.S. Cl.
CPC ............... *G09B 3/06* (2013.01); *Y10S 402/502* (2013.01)
USPC .......... 283/65; 281/2; 281/5; 281/38; 281/45; 281/48; 283/61; 283/62; 283/64; 283/116; 402/502

(58) Field of Classification Search
USPC ............ 281/2, 5, 15.1, 20, 24, 29, 35, 36, 38, 281/45, 48, 49, 51; 283/5, 61, 62, 64, 65, 283/116, 117; 402/80 R, 502
See application file for complete search history.

(56) References Cited

U.S. PATENT DOCUMENTS

| | | | |
|---|---|---|---|
| 1,490,934 A | 4/1924 | McDade | |
| 1,781,047 A | 11/1930 | Bondeson | |
| 2,879,608 A | 3/1959 | Watkins | |
| 3,089,260 A | 5/1963 | Gray | |
| 3,141,683 A | 7/1964 | Engelstein | |
| 3,258,857 A | 7/1966 | Behn | |
| 3,462,853 A * | 8/1969 | Kunert | 434/326 |
| 3,735,506 A * | 5/1973 | Kunert | 434/346 |
| 3,995,381 A | 12/1976 | Manfred et al. | |
| 4,349,346 A * | 9/1982 | Bromberg | 434/348 |
| 4,852,268 A | 8/1989 | Sutherland et al. | |
| 4,971,560 A | 11/1990 | Patel | |
| 5,154,616 A | 10/1992 | Hegardt et al. | |
| 5,213,373 A * | 5/1993 | Ramos | 283/5 |
| 5,858,795 A * | 1/1999 | Banayan | 436/71 |
| 6,817,516 B2 * | 11/2004 | VonNida et al. | 281/29 |
| 7,617,978 B1 * | 11/2009 | Albrecht et al. | 235/386 |
| 2008/0087728 A1 * | 4/2008 | Theisen | 235/386 |

* cited by examiner

*Primary Examiner* — Shelley Self
*Assistant Examiner* — Justin V Lewis
(74) *Attorney, Agent, or Firm* — Wood, Phillips, Katz, Clark & Mortimer

(57) ABSTRACT

A response form security device is provided for use with a generally planar response form having an answer area bearing answer blanks upon which a respondent makes marks to indicate a plurality of responses. The security device includes a sleeve adapted and constructed to slidably receive and cover the response form. An access window is formed in the sleeve, and permits visual access by the respondent to a number of fewer than all of the answer areas of the response form. The length of the sleeve and the configuration of the answer window are chosen so as to prevent anyone other than the user from seeing a number of marks on the answer area sufficient to observe a repeatable pattern of marks.

24 Claims, 3 Drawing Sheets

RESPONSE FORM SECURITY DEVICE

CROSS-REFERENCE TO RELATED APPLICATION

None.

BACKGROUND OF THE INVENTION

Optical mark recognition is the process of capturing data by contrasting reflectivity at predetermined positions on a page. By shining a beam of light onto the document the scanner is able to detect a marked area because it reflects less light than an unmarked surface. Some OMR devices use forms which are preprinted onto 'Transoptic' paper and measure the amount of light which passes through the paper, thus a mark on either side of the paper will reduce the amount of light passing through the paper.

Optical mark recognition is generally distinguished from optical character recognition by the fact that a recognition engine is not required. That is, the marks are constructed in such a way that there is little chance of not reading the marks correctly. This does require the image to have high contrast and an easily-recognizable or irrelevant shape. One of the most familiar applications of optical mark recognition is the use of #2 or HB pencil bubble optical answer sheets In multiple choice examinations. Students mark their answers, or other information, by darkening circles marked on a pre-printed sheet. Afterwards the sheet is automatically graded by a scanning machine. In most European countries, a horizontal or vertical 'tick' in a rectangular 'lozenge' is the most commonly used type of OMR form, the most familiar application being the UK National lottery form. Lozenge marks are a later technology and have the advantage of being easier to mark and easier to erase. The large 'bubble' marks are legacy technology from the very early OMR machines that were so insensitive a large mark was required for reliability. In most Asian countries, a special marker is used to fill in an optical answer sheet. Students, likewise mark answers or other information via darkening circles marked on a pre-printed sheet. Then the sheet is automatically graded by a scanning machine.

On of the most prevalent optical mark recognition systems in use is the traditional Scantron test scoring system. The Scantron system is usually seen as a multiple-choice, fill-in-the-bubble form of varying length and width, ranging from single-column, 15-answer tests, to forms of several 8.5×11 inch pages used in standardized testing, such as the SAT and the ACT. The forms are read optically, using optical mark recognition to detect markings in each place, in a "Scantron Machine", which tabulates results. Earlier versions were sensed electrically.

Commonly, there are two sides to Scantron answer sheets. They can contain 50 answer blanks, 100 answer blanks, and so on. A smaller form, called a "Quiz Strip", provides answer space for only about 20 questions. On the back of larger sheets is a space in which answers to other kinds of questions can be written. The 8.5×11-inch form may contain a larger area for working math problems, write long-hand answers, etc. Answers "A" and "B" are commonly used for "True or False" questions.

It is common for Scantron sheets to have instructions such as "Do not make any stray marks on the answer sheet", "Fill in each circle/square completely. To change your answer completely erase the mark" and "Please use a Number 2 pencil".

Grading of Scantron sheets is performed first by creating an answer key. The answer key is simply a standard Scantron answer sheet with all of the correct answers filled in, along with the "key" rectangle at the top of the sheet. The key is fed into the Scantron machine, which stores the correct answers in the memory. Further sheets fed are graded according to the key in memory. Switching the machine off stops the paper feed and clears the memory. Incorrect answers are marked with a red dash, or the correct answer (unless the correct answer is made up of multiple letters, such as BCE, in which case it will be marked with an asterisk), down the left side of the paper. In this way, students see which questions they answered correctly. The number of correct answers is printed on the form. It can also show a percentage grade along with the number of answers correct.

Although tests administered using optical mark recognition systems such as Scantron are relatively secure, they are not immune to attempts at cheating. One method often used is for one student to attempt to determine a pattern in the answer sheet of an adjacent student. Thus, even though the individual answer numbers may be too far away to be read, the position of answers in the answer columns may still be discernible. Unless an exam proctor catches the student in the act, this type of cheating is difficult to detect and thwart. Students have been known to copy patterns of answers from various neighboring students, making it particularly difficult to prove that they have cheated. Peer pressure is sometimes exerted on knowledgeable students to make their answer sheets easier to copy, for example, by making excessively dark marks on the response form.

In several contexts of varying relevance to test taking, the privacy of response forms has been the subject of inventive effort, and is reflected in the patent literature. For example, U.S. Pat. No. 5,154,616 to Hegardt is directed to an apparatus for obstructing a standardized test form from view of all but the test taker. The apparatus permits a test taker to see the necessary portions of the answer sheet but obstructs and obscures the view of answer marks from shallow angles or from a distance.

U.S. Pat. No. 4,971,560 to Patel shows a teaching aid for increasing the memorization of a large number of equations comprising a front cover having a vertical column of horizontally disposed completed equations visible thereon and which front cover forms a cut out portion adjacent the vertical column and a writing sheet which is removable and positionable under the cut out portion of said front cover for providing a replaceable writing area accessible through said cut out portion.

U.S. Pat. No. 4,852,268 to Sutherland describes a template intended for use with user marked lottery tickets. The template consists of two sheets of stiff material joined along a fold line. The sheets conform in shape and size to the lottery ticket to be marked. One sheet of the template is provided with an array of perforations outlining removable areas on the template that correspond in number, position and form to the user markable spaces on the lottery ticket. The template is preferably a transparent plastic material. In use, the removable areas corresponding to numbers to be marked on the lottery ticket are removed from the template so that a writing implement may be introduced through the resulting open areas for marking the desired spaces on the ticket. The template may be used not only for marking a ticket but for protecting the ticket from damage so that it can be used from time to time.

U.S. Pat. No. 3,995,381 to Manfred deals with a low visibility answer sheet and method of testing utilizing the same in which the answer areas on a multiple choice answer sheet are predarkened. The answers are made by darkening over a desired predarkened area. The contrast between a predarkened area which has been marked and a predarkened area which has not been marked by an examinee is significantly reduced and thus the potential for cheating by examinees viewing the answers entered by other examinees is decreased.

U.S. Pat. No. 1,781,047 to Bondeson discloses an educational device including an envelope having a plurality of openings and carrying test problems adjacent thereto. The answers to the problems are to be written by a student through the openings on a sheet of paper enclosed in the envelope. A sheet of cardboard is disposed in the envelope and back of the sheet of paper to afford an adequate writing surface for the paper, and to facilitate its placement in or removal from the envelope.

Although the arrangements described in these patents provide certain advantages, they present certain deficiencies as well. For example, many known devices require expensive and unwieldy optical filtering devices. Further, many of these devices are simply impractical for application in an academic testing environment. "Predarkened" answer sheets can present visibility problems for the examinee, resulting in entry errors, and may cause the examinee to make darker, easily-copied answer marks. Predarkening is also limited in its effectiveness when viewed at an angle. It can thus be seen that the need exists for a simple, efficient, and easily manufactured response form security system.

SUMMARY OF THE INVENTION

A response form security device is provided for use with a generally planar response form having an answer area bearing answer blanks upon which a respondent makes marks to indicate a plurality of responses. The security device includes a sleeve adapted and constructed to slidably receive and cover the response form. An access window is formed in the sleeve, and permits visual access by the respondent to a number of fewer than all of the answer areas of the response form. The length of the sleeve and the configuration of the answer window are chosen so as to prevent anyone other than the user from seeing a number of marks on the answer area sufficient to observe a repeatable pattern of marks.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
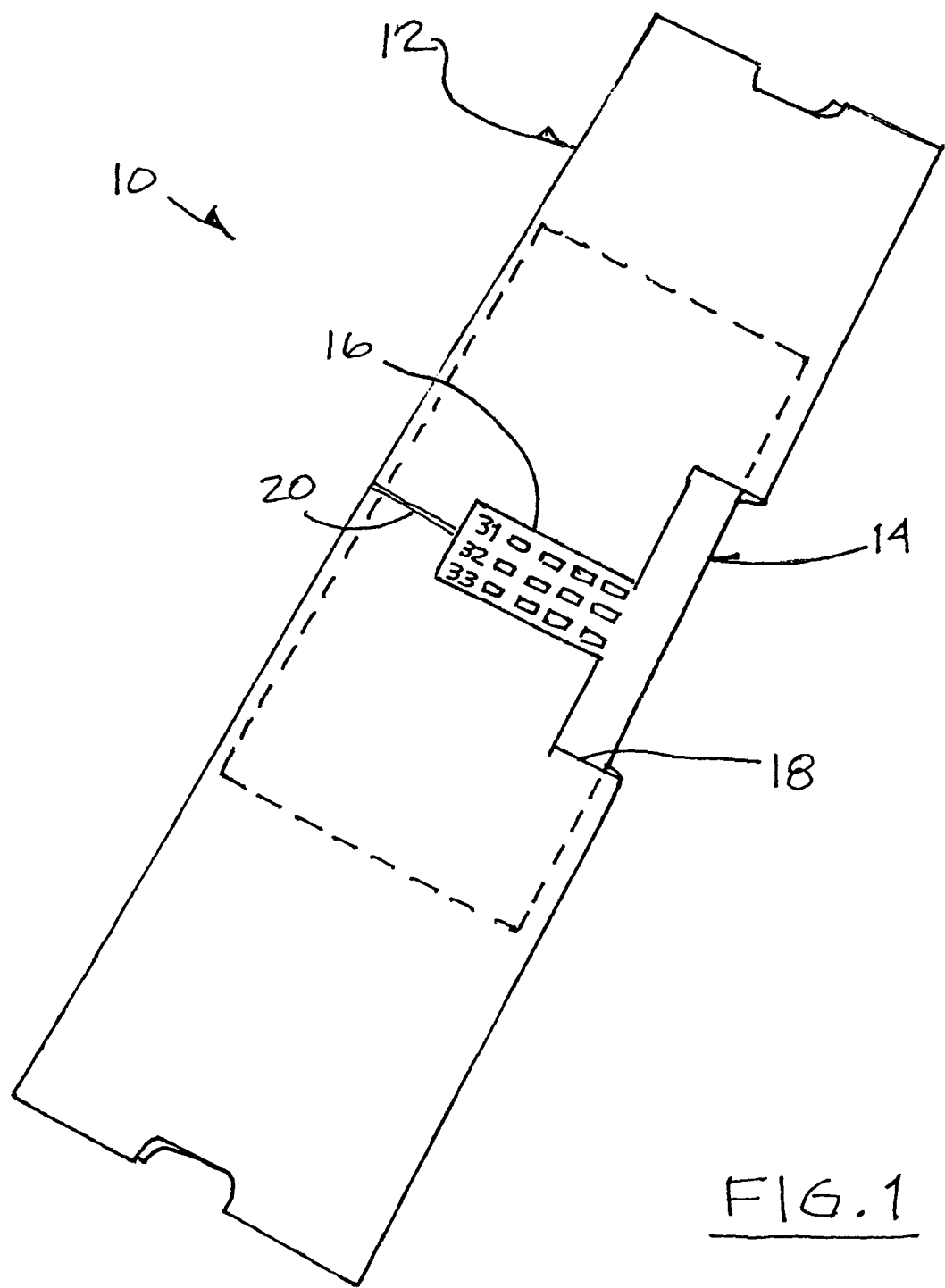
FIG. 1 illustrates a perspective view of an embodiment of a security device and enclosed response form in accordance with the principles of the present invention.

In the following description, specific details are set forth in order to provide a thorough understanding of the invention. However, it will be apparent that the invention may be practiced without these specific details. Without departing from the generality of the invention disclosed herein and without limiting the scope of the invention, the discussion that follows, will refer to the invention as depicted in the drawings.

An embodiment of a response form security device 10 in accordance with the principles of the present invention is shown in FIG. 1. The security device 10 includes a sleeve 12 with a length and width and closed sides and is adapted and constructed to slidably receive a generally planar response form 14. The response form 14 is slidable into and through lengthwise openings guidingly between the closed sides. The response form 14 is of a standard configuration having a length and width and an answer area bearing rows of answer blanks, spaced in a lengthwise direction, upon which a respondent makes marks to indicate a plurality of responses. One example of a response form with which the present invention finds particular utility is the Scantron form available from Scantron Corporation of Irvine, Calif. as used for standardized testing to identify answers to test questions.

With the response form 14 slid into the sleeve 12, with the lengths of the sleeve 12 and form 14 aligned, the answer area of the response form 14 is entirely covered, except for those rows of answer blanks visible through an access window 16 formed in widthwise center region of the sleeve 12. A grip recess 18 is formed at the lengthwise center of the sleeve 12, through one side of the sleeve 12 adjacent to, and in this embodiment contiguous with, the access window 16. The grip recess 18 is adapted and constructed to facilitate engagement and lengthwise sliding of the response form 14 within the sleeve 12 by allowing a user to easily grasp and slide the response form 14.

To take a test, a respondent/user places the response form in the sleeve so that at least a first answer blank is visually accessible through the access window and a second of the answer blanks is blocked from view by the blocking wall. To indicate a response to a first test question, the user makes a mark upon the first answer blank through the access window. Thereafter, the user slides the response form lengthwise relative to the sleeve so that the second answer blank is visually accessible through the access window and the first answer blank is blocked from view by the blocking wall. To indicate a response to the second test question, the user makes a mark upon the second answer blank through the access window. This process may be repeated until marks have been made upon additional answer blanks.

Figure 2:
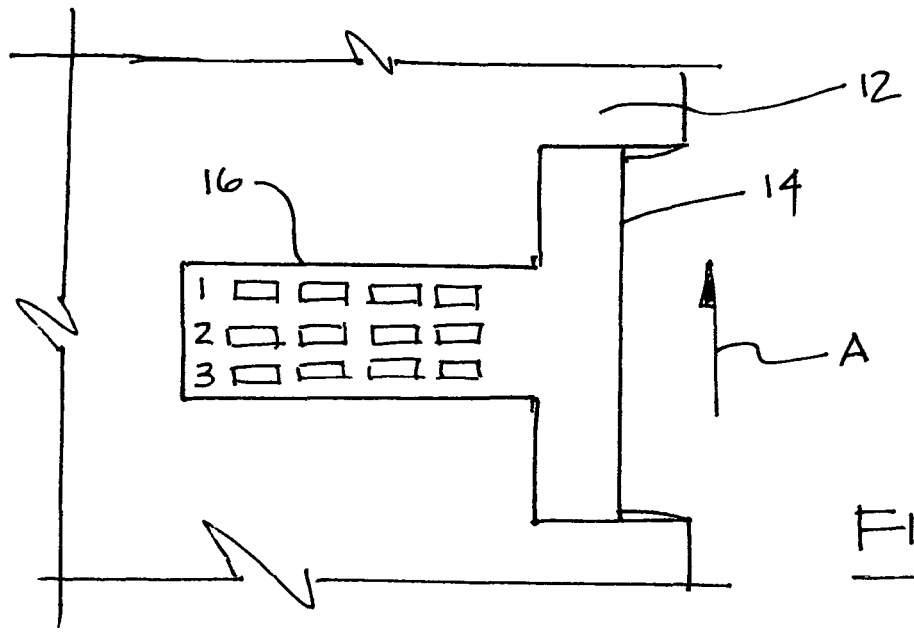
FIG. 2 illustrates a detailed view of the FIG. 1 embodiment with a response form in a first position.
Figure 3:
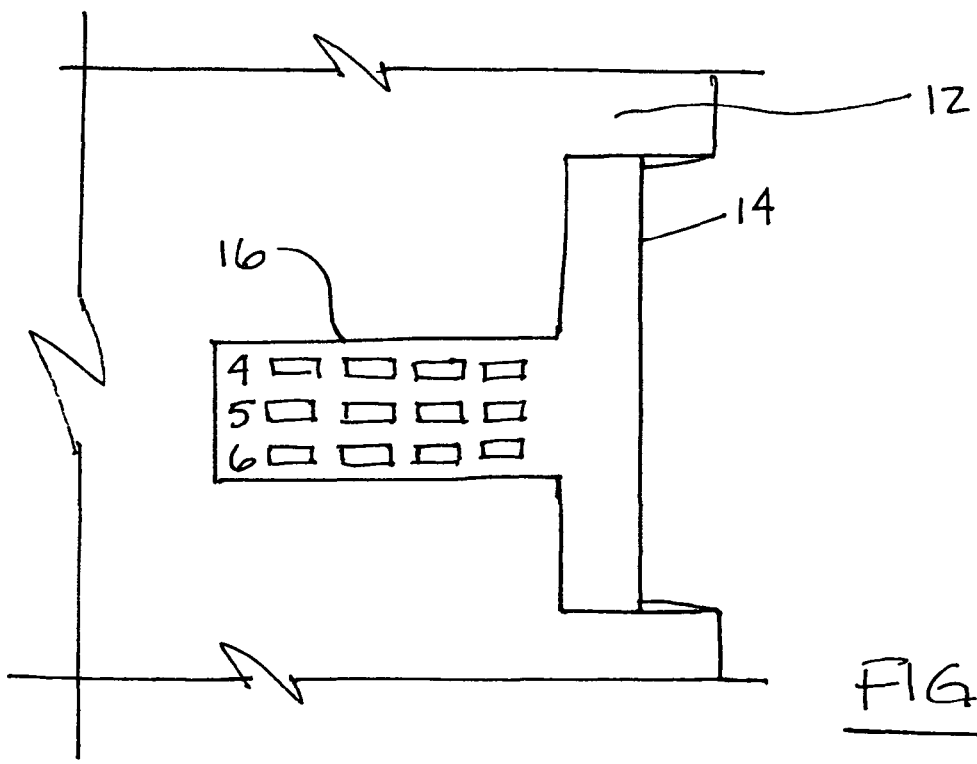
FIG. 3 illustrates a detailed view of the FIG. 1 embodiment with a response form moved to a second position.

The access window 16 is adapted and constructed to permit visual access by the respondent to a number of fewer than all of the answer areas of the response form 14, and the length of the sleeve 12 and the configuration of the answer window 16 are chosen so as to prevent anyone other than the user from seeing a number of marks on the answer area sufficient to observe a repeatable pattern of marks. The sleeve 12 is provided with a length that is sufficient to insure that the answer areas are covered by the sleeve when the test form is positioned to expose the first answer, the last answer, and all answers in between. As seen in FIG. 2, answers rows 1 through 3 of 50 answer rows are visible in the access window 16. After the responses to 1 through 3 are recorded, the user slides the response form 14 in the direction of arrow A, exposing the next set of answer rows (4 through 6) as shown in FIG. 3. Persons sitting in a typical testing environment would be seated far enough away from one another so that the specific numbers exposed in the access window would be unreadable. Since only a few answers are visible at a time, it is impossible for anyone to observe a visual pattern of answers.

In practice, it should be sufficient to provide the sleeve 12 with a length approximately 1½ to 2 times the length of the response form 14. In the illustrated example, the sleeve 12 has a length of approximately 18 inches. With these dimensions, the access window is approximately ⅜ inches long and approximately 2¾ inches wide, and the grip recess approximately 1¾ by 3 inches.

The number of rows of marks visible in access window 12 will vary with the configuration of the response form and the degree of security needed. In general, it is contemplated that permitting viewing of between 1 and 5 rows of marks should suffice.

Figure 4:
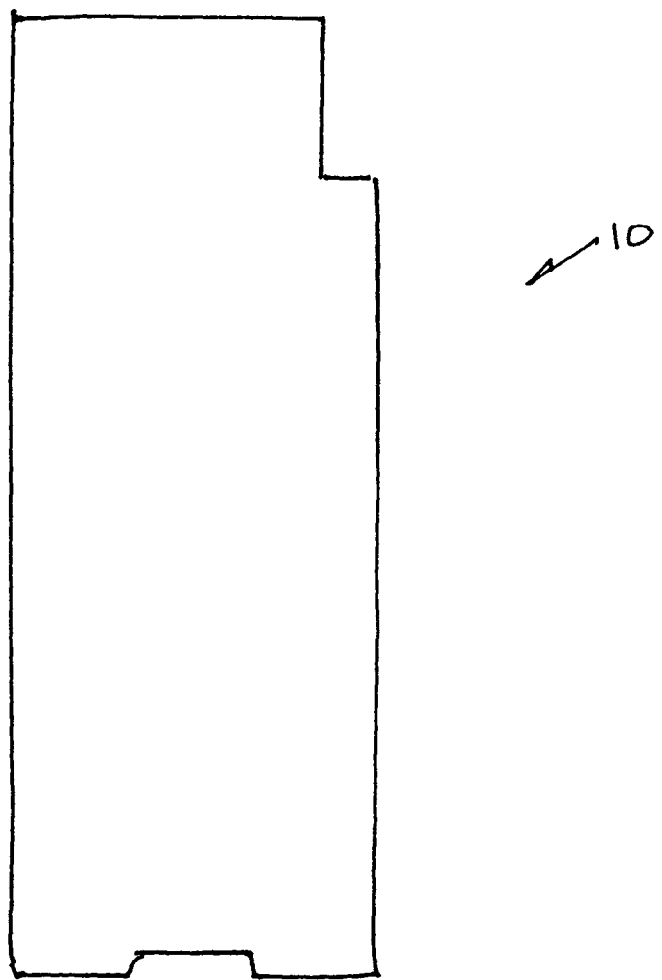
FIG. 4 illustrates a security device folded in a transport and storage position.

The length of the sleeve 12 may render the security device 10 unwieldy for convenient transport and storage. To address this potential problem, as seen in FIG. 4, the security device 10 is adapted to fold in a predetermined manner in half along a fold crease 20 (FIG. 1) for storage and transport. This allows the security device 10 to be easily carried in a standard folder or briefcase. The security device 10 can be fabricated from any sufficiently stiff and durable material. It is contemplated that a material such as the fiberboard used in manufacturing portfolio covers and folders will prove suitable, although plastics or other materials can also be employed.

While this invention has been described in connection with the best mode presently contemplated by the inventor for carrying out her invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim as my invention:

1. In combination:
   a) a generally planar response form having a generally flat surface with a length and width and an answer area bearing a plurality of answer blanks in a first plurality of rows spaced in a lengthwise direction upon which a respondent makes marks to indicate a response; and
   b) a response form security device comprising:
   a sleeve having a length and width, a blocking wall, sides spaced in a widthwise direction, and a top and bottom spaced in a lengthwise direction, the sleeve and response form configured so that the sleeve slidably receives the flat surface of the response form with the sleeve and response form operatively engaged wherein the lengths of the response form and sleeve are aligned and the blocking wall covers the flat surface and blocks visual access to a plurality of answer blanks that the blocking wall overlies; and
   an access window formed in the sleeve and through the blocking wall through which visual access by the respondent is given to less than all of the rows of answer blanks over which the access window aligns with the sleeve and response form operatively engaged,
   the operatively engaged sleeve and response form configured to be guidingly movable selectively lengthwise relative to each other so that visual access to different rows of answer blanks in the first plurality of rows of answer blanks is given upon which marks are made through the access window to indicate a response while the blocking wall covers a plurality of other rows of answer blanks in the first plurality of rows of answer blanks upon which a respondent makes marks,
   the sleeve having a length that is substantially greater than the length of the response form,
   the sleeve and response form configured so that the plurality of other rows of answer blanks with marks thereon that are blocked are sufficient that it is not possible to observe any repeatable pattern of marks in the other rows of answers blanks.

2. The combination of claim 1, wherein the sleeve has a length approximately twice that of the length of the response form.

3. The combination of claim 2, wherein the sleeve length is approximately 18 inches.

4. The combination of claim 1, further comprising a grip recess formed in the sleeve, the grip recess exposing a portion of the response form that is gripped by the respondent to move the response form guidingly lengthwise within the sleeve.

5. The combination of claim 4, wherein the response form has a peripheral edge and the grip recess is located at and formed through one of the sleeve sides so that the peripheral edge of the response form is exposed at the one of the sleeve sides.

6. The combination of claim 1, wherein the access window is approximately centered between the sides of the sleeve.

7. The combination of claim 1, wherein the number of rows of marks visible in the access window is greater than one.

8. The combination of claim 7, wherein the number of rows of marks visible in the access window is five or fewer.

9. The combination of claim 1, wherein the sleeve is configured so that once fully assembled it folds in a predetermined manner to reduce the sleeve length for storage and transport.

10. The combination of claim 1, wherein the response form is a optically readable card.

11. The combination of claim 1, wherein the access window is approximately ⅜ inches long.

12. The combination of claim 1, wherein the access window is approximately 2¾ inches wide.

13. The combination of claim 4 wherein the grip recess is contiguous with the access window.

14. In combination:
   a) a generally planar response form having a generally flat surface with a length and width and an answer area bearing a first plurality of answer blanks in a first plurality of rows spaced in a lengthwise direction upon which a respondent makes marks to indicate a response; and
   b) a response form security device comprising:

a sleeve having a length and width, a blocking wall, sides spaced in a widthwise direction, and a top and bottom spaced in a lengthwise direction, the sleeve and response form configured so that the sleeve slidably receives the flat surface of the response form with the sleeve and response form operatively engaged with the lengths of the response form and sleeve aligned so that the blocking wall covers the flat surface and thereby blocks visual access to answer blanks that the blocking wall overlies; and an access window formed in the sleeve and through the blocking wall and constructed so that less than all of the answer blanks in the first plurality of rows of answer blanks over which the access window aligns with the sleeve and response form operatively engaged are visible by the respondent through the access window, the operatively engaged sleeve and response form configured to be movable selectively lengthwise relative to each other so that visual access through the access window is permitted to different rows of answer blanks in the first plurality of rows of answer blanks upon which marks are made through the access window to indicate a response while the blocking wall covers other rows of answer blanks in the first plurality of rows of answer blanks upon which a respondent makes marks, the length of the sleeve and configuration of the answer window chosen so that the blocking wall covers a plurality of the answer areas except all but one or a plurality of the answer areas that are visually accessible through the access window, as the response form and sleeve are moved lengthwise relative to each other into a plurality of different relative positions with the sleeve and response form operatively engaged, the plurality of answer areas visible through the access window at any time not sufficient to allow observance of a repeatable pattern of marks through the access window with the response form and sleeve in the plurality of different relative positions to permit any significant copying of responses, the length of the sleeve and configuration of the answer window further chosen so that with any rows of answer blanks visually accessible at the access window, a sufficient number of the other rows of answer blanks with marks thereon and not visible through the access areas are covered by the blocking wall so that at any time it is not possible to observe any repeatable pattern of marks made in the other rows of answer blanks.

15. The combination of claim 14 wherein the length of the sleeve and configuration of the answer window are chosen so that with any of the rows of answer blanks visually accessible at the access window, substantially all rows of answer blanks not visually accessible at the access window are covered and blocked from view by the sleeve.

16. The combination of claim 14, wherein the sleeve has closed sides between lengthwise open ends into and through which the response form is directed and thereby guided in a lengthwise direction by the sleeve between the closed sides.

17. The combination of claim 14, wherein the sleeve has a length approximately twice that of the length of the response form.

18. The combination of claim 15, wherein the response form has a peripheral edge and further comprising a grip recess formed through one of the closed sides in the sleeve, the grip recess exposing a length of the peripheral edge that is gripped by the respondent to slide the response form within the sleeve.

19. The combination of claim 1 wherein the sleeve has closed sides between lengthwise open ends into and through which the response form is directed and guided in a lengthwise direction by the sleeve between the closed sides.

20. The combination of claim 14 wherein the sleeve has closed sides between lengthwise ends and one of the ends is open, the response form directed into and through the one open end.

21. The combination according to claim 14 wherein the other rows of answer blanks consists of at least three rows of answer blanks.

22. The combination according to claim 1 wherein the other rows of answer blanks consists of at least three rows of answer blanks.

23. The combination according to claim 1 wherein the sleeve and response form are configured so that with any of the rows of answer blanks visually accessible at the access window, substantially all rows of answer blanks not visually accessible at the access window are covered and blocked from view by the sleeve.

24. The combination according to claim 1 wherein the length of the sleeve and configuration of the answer window are chosen so that with any of the rows of answer blanks visually accessible at the access window, all rows of answer blanks not visually accessible at the access window are covered and blocked from view by the sleeve.

* * * * *